(12) United States Patent
Dudley et al.

(10) Patent No.: US 9,555,541 B2
(45) Date of Patent: Jan. 31, 2017

(54) HANDHELD COLLECTOR DEVICE FOR GATHERING SMALL OBJECTS

(71) Applicants: Caleb M. Dudley, Jacksonville, FL (US); Silas L. Dudley, Jacksonville, FL (US)

(72) Inventors: Caleb M. Dudley, Jacksonville, FL (US); Silas L. Dudley, Jacksonville, FL (US)

( * ) Notice: Subject to any disclaimer, the term of this patent is extended or adjusted under 35 U.S.C. 154(b) by 0 days.

(21) Appl. No.: 14/933,854

(22) Filed: Nov. 5, 2015

(65) Prior Publication Data

US 2016/0129584 A1    May 12, 2016

Related U.S. Application Data

(60) Provisional application No. 62/076,116, filed on Nov. 6, 2014.

(51) Int. Cl.
| | | |
|---|---|---|
| *A01K 97/14* | (2006.01) |
| *B25J 1/04* | (2006.01) |
| *B25B 9/02* | (2006.01) |
| *E01H 1/12* | (2006.01) |

(52) U.S. Cl.
CPC .. *B25J 1/04* (2013.01); *B25B 9/02* (2013.01); *E01H 1/12* (2013.01)

(58) Field of Classification Search
CPC ........ A01D 46/24; A01D 46/005; A01D 7/10; A01D 9/00; B25J 7/00; B25J 1/04; A63B 47/02; A63B 47/021; A01B 1/18; E01H 1/12; A01C 3/06; B25B 9/02
USPC .............. 294/19.2, 99.1, 1.4, 50.5, 55.5, 61; 56/328.1, 332, 400.12, 400.08; 414/439, 414/440
See application file for complete search history.

(56) References Cited

U.S. PATENT DOCUMENTS

| | | | | |
|---|---|---|---|---|
| 1,246,487 | A | * 11/1917 | Summers et al. | ... A01D 46/087 294/61 |
| 2,500,647 | A | * 3/1950 | Schulthess | ................ E01H 1/12 294/50 |
| 2,736,157 | A | 2/1956 | Weathersby | |
| 2,738,215 | A | * 3/1956 | Thompson | ................ E01H 1/12 294/61 |
| 2,788,630 | A | 4/1957 | Nisbet | |
| 2,800,354 | A | * 7/1957 | King | ......................... E01H 1/12 294/50.5 |
| 2,972,851 | A | 2/1961 | Goehring | |
| 3,068,634 | A | 12/1962 | Robinson | |
| 4,081,192 | A | * 3/1978 | Jones | ....................... A01D 9/06 294/61 |
| 4,848,071 | A | 7/1989 | Laughlin | |
| 4,964,665 | A | 10/1990 | Crow | |
| 5,168,692 | A | 12/1992 | Dudley | |

(Continued)

*Primary Examiner* — Stephen Vu
(74) *Attorney, Agent, or Firm* — Thomas C. Saitta

(57) ABSTRACT

A handheld collector device adapted to retrieve small objects, the device having an elongated handle, a head mounted to the handle, a plurality of tine sets retained by the head and an ejection mechanism to eject the objects. Each tine set has a plurality of individual tines projecting outwardly in spaced relation. The tines are relatively rigid members possessing a degree of flexibility such that when the ends of the tines are pressed onto objects to be collected, the tines flex sufficiently to pass over and capture the objects. The device is modular in construction such that the tine sets can be removed and replaced in order to adapt the device to provide optimum results for varying sizes and types of objects.

16 Claims, 5 Drawing Sheets

(56) References Cited

U.S. PATENT DOCUMENTS

| | | |
|---|---|---|
| 5,335,953 A | 8/1994 | Luther, Sr. |
| 5,380,054 A | 1/1995 | Galvis |
| 6,460,249 B1 | 10/2002 | Holt, Jr. |
| 6,470,618 B1 | 10/2002 | White |
| 6,925,791 B2 | 8/2005 | Herndon |
| 7,455,493 B2 * | 11/2008 | Schoppe .............. A63B 47/024 414/440 |
| 7,536,848 B2 * | 5/2009 | Briesemeister ........ A01D 51/00 15/84 |
| 7,698,882 B1 | 4/2010 | Tinlin |

* cited by examiner

FIG. 4
FIG. 5
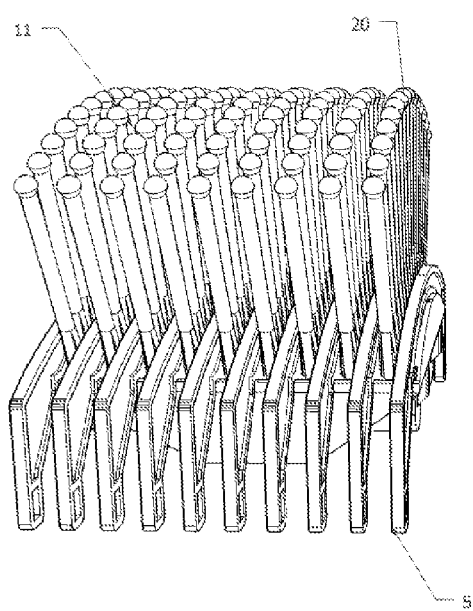
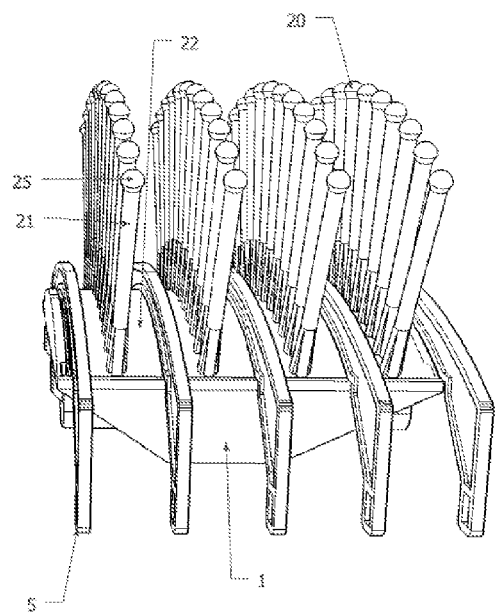

HANDHELD COLLECTOR DEVICE FOR GATHERING SMALL OBJECTS

This application claims the benefit of U.S. Provisional Patent Application Ser. No. 62/076,116, filed Nov. 6, 2014.

BACKGROUND OF THE INVENTION

The invention relates generally to collector devices structured to collect, gather or retrieve small three-dimensional objects dispersed on a surface, such as the ground or floor. More particularly, the invention relates to such devices that are handheld and that comprise a discharge or ejection mechanism for releasing or removing the small objects from the device.

There are situations where it is desired or necessary to gather up a large number of small objects that have been spread on the ground or another surface, such as for example, nuts that have dropped from pecan trees, golf balls on a practice range, shell casings at a shooting range, etc. Picking up each object by hand is time-consuming and uncomfortable, as the worker must stoop or kneel to retrieve the objects. With shell casings or other objects, it may be desirable to avoid skin contact due to toxic, corrosive or irritating residues present on the objects. A number of tools have been developed to make gathering the small objects a less arduous task, some of which are relatively large devices often towed behind motorized vehicles and some of which are handheld. One type of handheld device involves a collector assembly mounted onto a long handle, the collector assembly comprising a plurality of bales or wires that spread apart when pushed onto one or more object and then return to a close proximity to entrap the object within the collector assembly. Examples of these and similar devices are shown in U.S. Pat. No. 2,736,157 to Weathersby, U.S. Pat. No. 2,788,630 to Nisbet, U.S. Pat. No. 2,972,851 to Goehring, U.S. Pat. No. 4,848,071 to Laughlin, U.S. Pat. No. 5,335,953 to Luther, Sr., U.S. Pat. No. 6,470,618 to White, U.S. Pat. No. 6,925,791 to Herndon, and U.S. Pat. No. 7,698,882 to Tinlin.

These devices do not provide optimal mechanisms for retrieving or for ejecting the objects. For example, the wires or bales may be permanently deformed after a large number of uses if the device is pressed onto an excessively large object. Some devices do not possess mechanisms for ejecting the objects that have been retrieved. Some devices are not adjustable in order to accommodate different sized objects.

It is an object of this invention to provide an improved handheld collector device for gathering small objects dispersed on a ground or floor surface, the device also having an ejection mechanism for easily and quickly releasing the objects from the device. It is a further object to provide such an improved handheld collector that is modular in construction such that the device can be easily adapted or reconfigured to correspond to the particular size of the objects being gathered, or to replace individual components that have been damaged.

BRIEF DESCRIPTION OF THE DRAWINGS

FIG. 4 is a view showing a distal collector assembly assembled to retrieve relatively small objects.

FIG. 5 is a view showing a distal collector assembly assembled to retrieve relatively larger objects than the assembly of FIG. 4.

SUMMARY OF THE INVENTION

Figure 1:
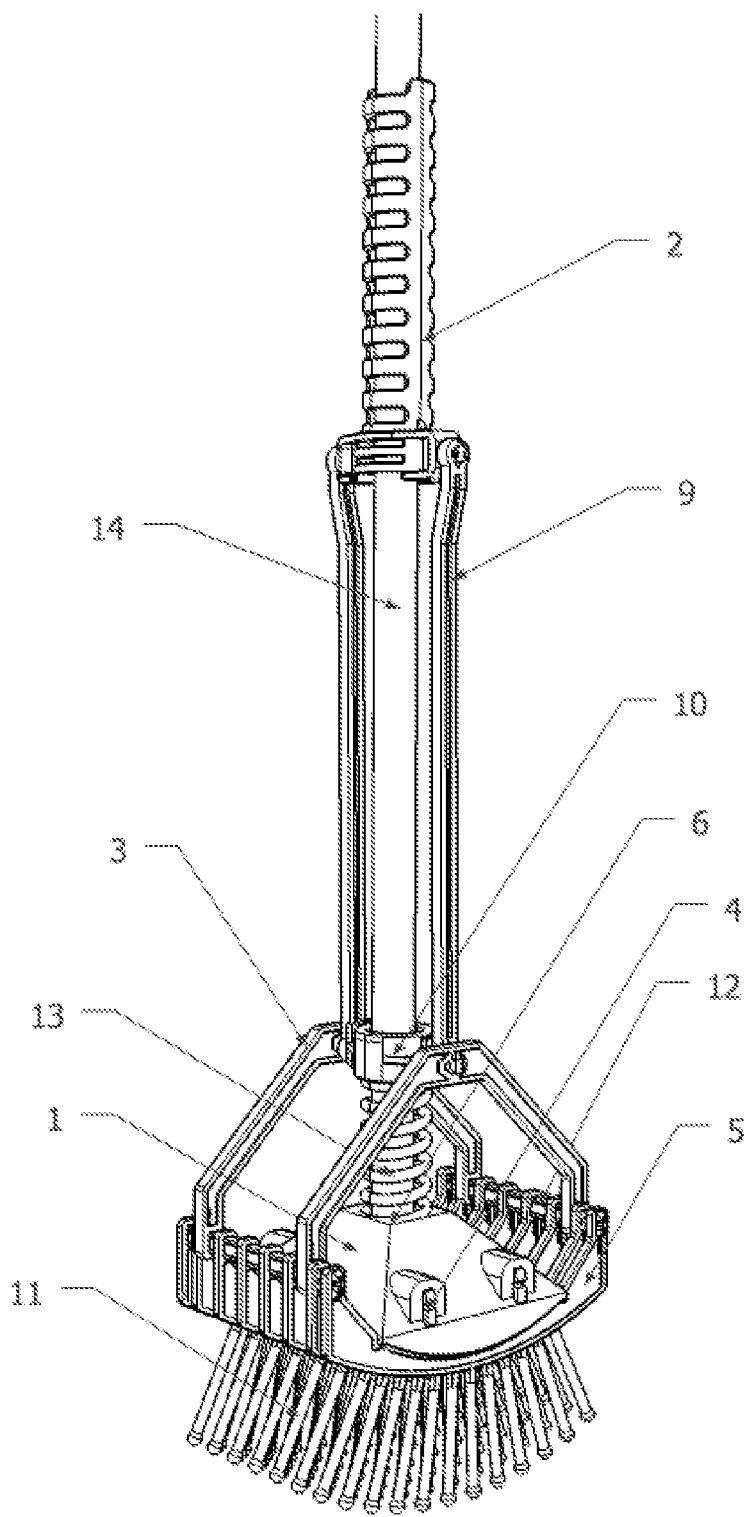
FIG. 1 is a perspective view of an embodiment of the handheld collector device for gathering small objects.
Figure 2:
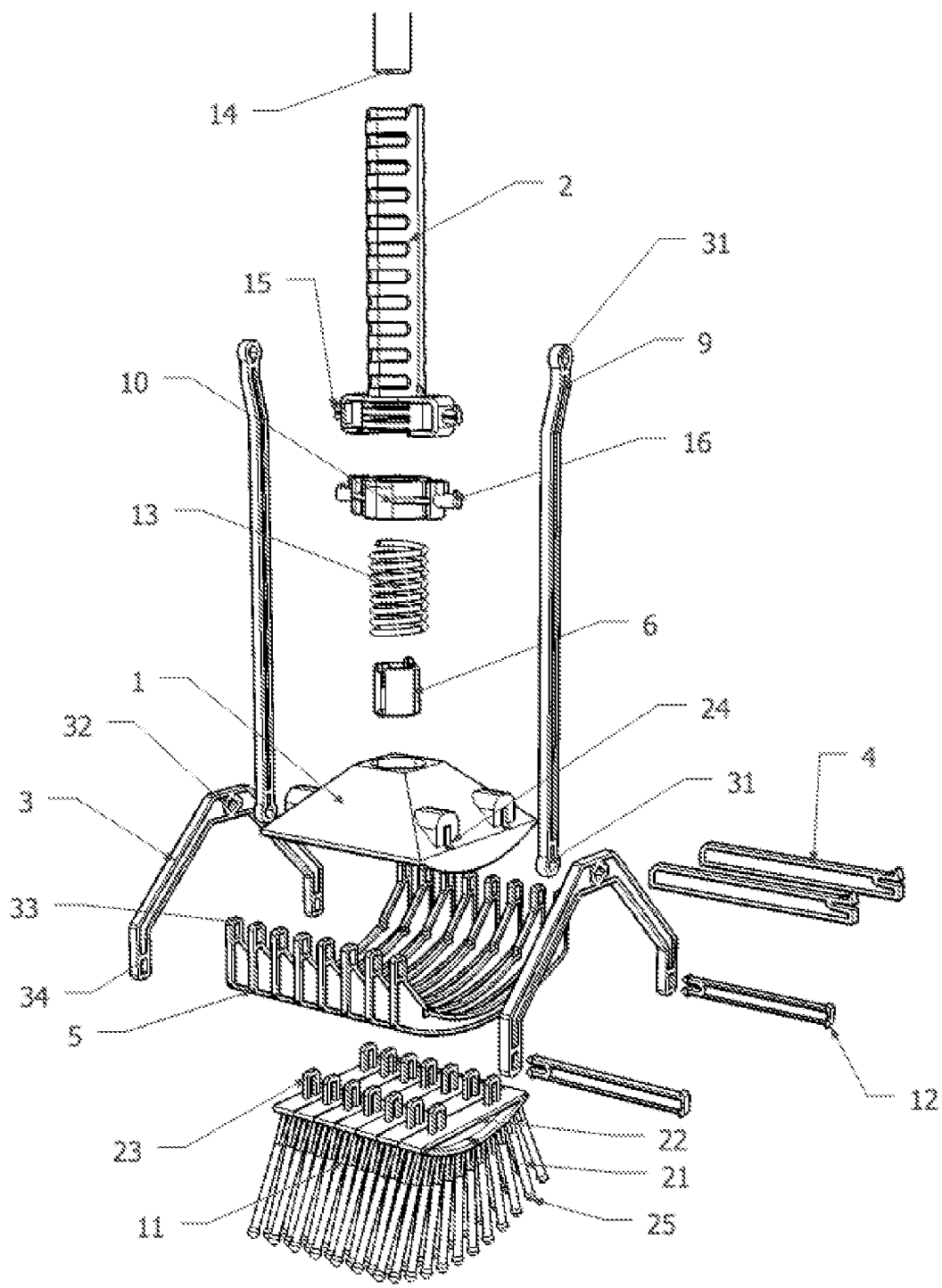
FIG. 2 is an exploded view of the embodiment of FIG. 1.
Figure 3:
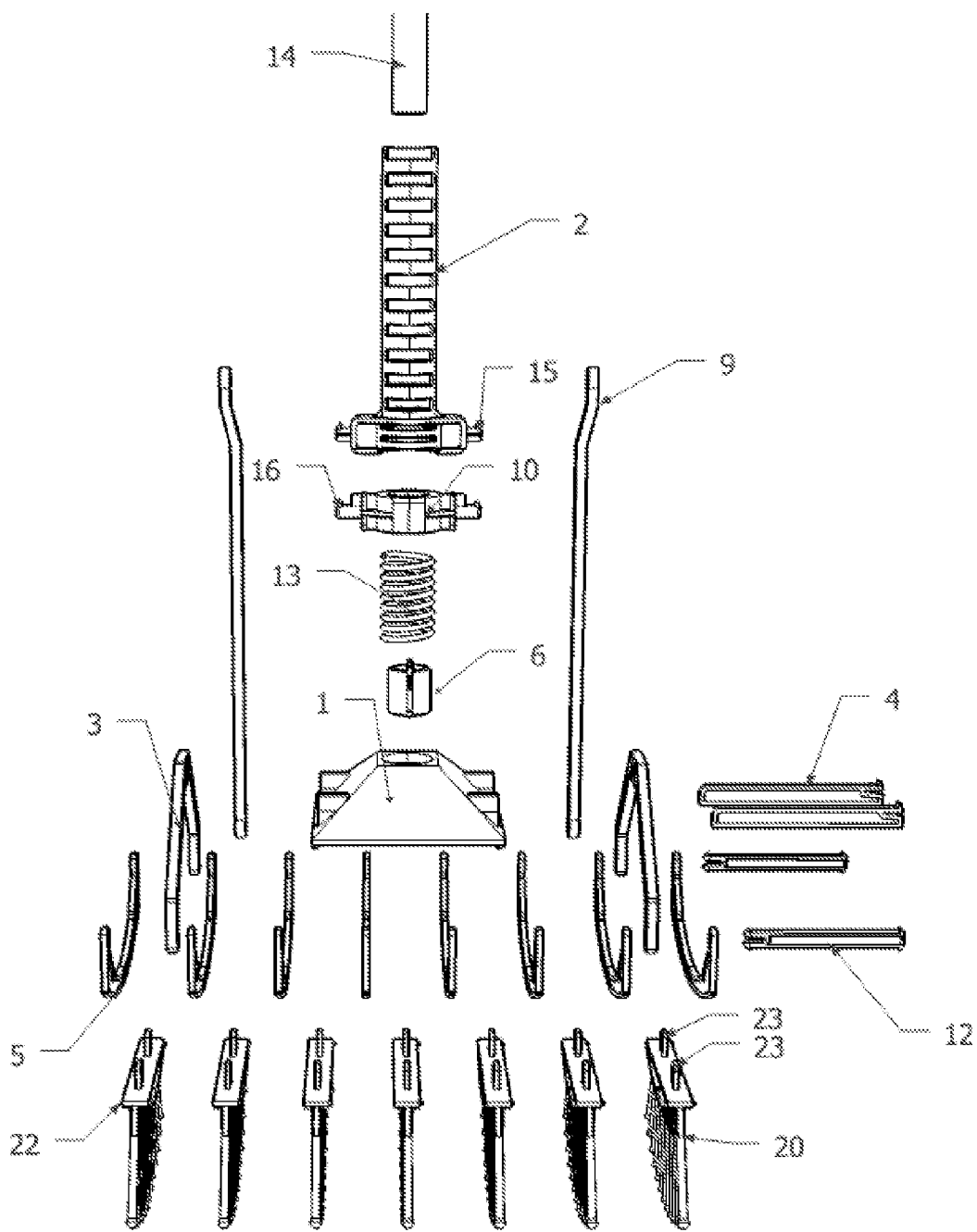
FIG. 3 is another exploded view of the embodiment of FIG. 1 focusing on the distal collector assembly.
Figure 6:
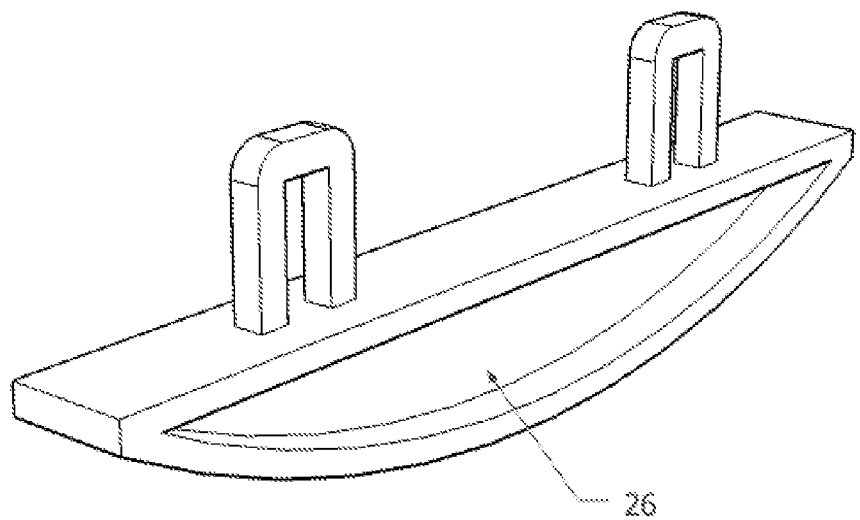
FIG. 6 shows a spacer member.

The invention is a handheld collector device adapted to gather, capture or retrieve small objects, the device having an ejection mechanism to easily expel the collected objects from the device. The collector device is particularly suited to collecting a large number of small objects dispersed on a floor or ground surface, such as for example nuts, golf balls, shell casings, etc.

The collector device in general comprises an elongated handle, a head mounted to the handle and a plurality of tine sets retained by the head. Each tine set comprises a plurality of individual tines projecting outwardly in spaced relation. The tines are relatively rigid members possessing a degree of flexibility such that when the ends of the tines are pressed onto objects to be collected, the tines flex sufficiently to pass over and capture the objects. The collector device further comprises an ejection mechanism whereby collected objects can be easily ejected from the tines in a straightforward, one-step action. The device is modular in construction such that the tine sets can be removed and replaced in order to adapt the device to provide optimum results for varying sizes and types of objects. For example, the tine sets may vary in number of tines, in the spacing of the tines, in the rigidity of the tines, etc.

DETAILED DESCRIPTION OF THE INVENTION

With reference to the drawings, embodiments of the invention will now be described in detail. In a broad sense, the invention in various embodiments is an improved handheld collector device for gathering small objects dispersed on a ground or floor surface, the device also most preferably having an ejection mechanism for quickly releasing the objects from the device, wherein the device is modular in construction such that the device can be easily adapted or reconfigured to account for the particular size or type of objects being gathered.

As used herein, the term "proximal" shall refer to the direction toward the free end of the handle of the device and the term "distal" shall refer to the opposite direction toward the operative end of the device, i.e., toward the tines of the device.

The device comprises an elongated handle 14, preferably cylindrical or tubular, which is attached either permanently or removably to a head member 1. In an exemplary embodiment, the head 1 may be provided with an internally threaded bore or a threaded insert member 6 and the handle 14 provided with a corresponding externally threaded distal end so as to mate with the head 1. The handle 14 may vary in length, with a longer handle of about 3 to 4 feet for example being preferred for situations where it is most comfortable for the user to be standing while gathering objects on the ground, or with a shorter handle of about a foot or so being preferred for situations where more control is required or the objects are on raised surfaces relative to the user, such as a table top.

Head 1 is a housing member having an open distal side and is adapted to receive and retain a plurality of tine sets 20 in a manner such that the tine sets 20 extend outwardly in the distal direction beyond the head 1 and away from the handle 14. Each tine set 20 comprises a plurality of elongated tines or projection members 21 mounted onto a convexly curved, elongated, narrow base 22, preferably in a linear alignment. The tines 21 are preferably of equal length such that the convex base 22 results in the distal ends of the tines 21 presenting a curved external or distal configuration, i.e., the ends of the tines 21 of a tine set 20 are disposed along an arc. Alternatively, each tine set 20 may consist of a multiple rows of tines 21. Alternatively, the base 22 could be planar and the length of the tines 21 could vary to provide the curved external configuration. The curved external configuration of the ends of the tines provides for effective capture of the objects without requiring the device to be perpendicularly aligned with the ground surface, and allows the device to be operated with a more efficient rolling or pivoting motion rather than a linear stabbing motion.

The tine sets 20 are mounted laterally in side-by-side manner on head 1 to create a tine assembly 11. In a preferred embodiment as shown, the tine sets 20 are secured by providing slotted tabs 23 on or extending from the proximal sides of the tine bases 22. The head 1 is provided with opposing lateral slots 24 such that when assembled the slotted tabs 23 of the tine bases 22 align with the slotted tabs 23, such that with the slotted tabs 23 of the tine bases 22 positioned within the open distal side of the head 1, connector beams or members 4 can be inserted through the aligned head slots 24 and tine base slotted members 23 to retain a plurality of tine sets 20 in side-by-side abutment. Preferably the connector beams 4 are configured to snap into a secured position without requiring an additional fastening member. The tines 21 are composed of a material that is substantially rigid yet slightly flexible, such as a hard plastic or metal, such that when the tines 21 are pushed onto an object to be retrieved, the tines 21 flex slightly and the distal ends of tines 21 separate, passing over and around the object. The tines 21 are preferably provided on their distal ends with knobs, flanges or like retention members 25 in order to better retain the collected objects within the tine assembly 11. When the collected objects are removed from the within the tine sets such that no objects remain to distort or flex the tines 21, the tines 21 return or rebound to their original neutral configuration.

With this structure small objects dispersed on a ground or floor surface are gathered by positioning the head 1 over one or more objects and pressing the tine assembly 11 downward to the surface, thereby forcing the tines 21 onto and around the objects. The rigidity of the objects causes the tines 21 to spread as the head 1 is pressed down, such that the objects become entrapped between the tines 21, the tines 21 being sufficiently rigid to hold the objects within the tine assembly 11. The retention members 25 on the distal ends of the tines 21 prevent the objects from falling from the tine assembly 11 once the device is raised from the ground surface.

Most preferably the improved handheld collector device for gathering small objects further comprises an ejector assembly that enables the user to easily and rapidly eject or release the gathered objects from the tine assembly 11. The embodiment of the ejector assembly shown in the drawings comprises a tubular sliding sleeve grip member 2 coaxially positioned on the main handle 14, the sliding sleeve grip member 2 able to be moved axially along the main handle 14. The sliding sleeve grip member 2 is preferably of sufficient length to be easily gripped by the hand of the user, for example approximately 4-6 inches. The distal end of the sliding sleeve grip member 2 is provided with connecting members or posts 15 for connection of the sliding sleeve grip member 2 directly to the ejector assembly, or in an extended manner a distance away from the ejector assembly using extension members or arms 9.

A plurality of generally C-shaped ejector blade members 5 are provided, each of the ejector blades 5 having a pair of slots 33 disposed in the legs of the ejector blades 5. The ejector blades 5 each have a curved distal surface generally corresponding to the external curvature of the distal ends of the tines 21. A generally C-shaped strut member 3 is disposed to each side of the ejector blades 5, each of the strut members 3 having a pair of slots 34 disposed in the legs of the strut members 3. The legs of the strut members 3 extend in the distal direction, while the legs of the ejector blades 5 extend in the proximal direction. A pair of ejector connector beams 12 extends through the slots 34 in the strut members 3 and the slots 33 in the ejector blades 5 such that the ejector blades 5 and strut members 3 are assembled into a unit. Preferably the connector beams 12 are configured to snap securely into position without requiring additional fastener members.

Slots 32 are provided in the proximal portions of the strut members 3 for connection of the strut members 3 to the sliding sleeve grip member 2. The strut members 3 may be connected directly to the distal end of the sliding sleeve grip member 2 by passing the connecting posts 15 through the slots 32 in the proximal portions of the strut members 3. This configuration is preferred when the objects are to be picked up or dropped onto a table or other raised surface or bin, or into a shoulder satchel or pouch, since it allows the user's hand to be positioned closer to the tine assembly 11 during the ejection operation.

Alternatively, the ejector assembly may be provided with extension arms 9 and an extension base 10, whereby the extension collar 10 is a short sleeve or member that is slidingly disposed on the handle 14. The extension collar 10 is provided with opposing connecting members or posts 16 which are received by the slots 32 in the proximal portions of the strut members 3. The extension arms 9 are elongated members having slots 31 at each end, whereby the distal ends of the extension arms 9 may be connected to the posts 16 of the extension collar 10 and the proximal ends of the extension arms 9 may be connected to the posts 15 of the sliding sleeve grip member 2. This configuration positions the sliding sleeve grip member 2 farther up the main handle 14 in the proximal direction, which is preferred when the collected objects are to be ejected onto the ground surface or into a container set on the ground surface. A helical spring 13 is coaxially mounted onto the main handle 14 between the head 1 and the distal end of the sliding sleeve grip member 2 or between the head 1 and the extension collar 10 in order to maintain the ejector assembly proximally biased or disposed in a recessed or neutral position relative to the tine assembly 11 until actuated by the user.

The ejector blades 5 are alternatingly disposed between the tine sets 20 such that one ejector blade 5 is positioned between each adjoining tine set 20. An ejector blade 5 is also preferably positioned exterior to each of the outermost tine sets 20. In this manner advancing the sliding sleeve grip member 2 distally down the main handle 14 moves the ejector blades 5 from the recessed neutral position toward the distal ends of the tines 21, thereby ejecting any objects retained within the tine assembly 11 in one motion. Upon release of the sliding sleeve grip member 2, the spring 13 pushes the sliding sleeve grip member 2 or the extension collar 10 in the proximal direction, thereby retracting the ejector blades 5 proximally so that the device is ready for use again.

The described structure provides a modular construction that allows the device to be disassembled and reassembled as needed to gather objects of differing size or type. As shown comparatively in FIGS. 4 and 5, closely spaced tine sets 21 may be replaced with tine sets 21 of greater separation, the tine bases 22 being wider to spread the tine sets 21 laterally. Alternatively, tine sets 20 having fewer tines 21 and/or tine sets 20 of differing flexibility or differing lengths may be utilized. With a reduced number of tine sets 20, fewer ejector blades 5 are required to be mounted onto the ejector connector beams 12. Alternatively, spacer members 26 in the shape of the tine base members 22 with slots 23 but having no tines 21 may be positioned between adjacent tine sets 20 to provide a larger lateral gap between tine sets 20.

Another advantage of the device as described is that it may be assembled without the need for screws or similar mechanical fasteners, thereby allowing for quick and easy size adjustment if needed. For example, in a shooting range scenario there may be shell cases of varying sizes to be retrieved from the ground surface. Shells of .22 caliber may require a gap of less than 0.2 inches between tines 21, 9 millimeter shells may require a gap of 0.25 inches, and shotgun shells will require even larger gaps. The ability to rapidly adjust the sizing of the gathering device is very advantageous, and the ejection assembly insures that the user will not have to make contact with the shell cases, thereby avoiding lead contamination. An agricultural scenario may present similar sizing issues, in that the gaps must be adjusted depending on whether acorns, pecans, pine cones, etc. are being picked up.

It is understood that equivalents and substitutions for certain elements set forth above may be obvious to those of ordinary skill in the art, and therefore the true scope and definition of the invention is to be as set forth in the following claims. It is to be understood that the embodiments disclosed in the illustrations are not meant to be limiting with regard to the true scope and definition of the invention.

We claim:

1. A handheld collector device comprising:
    an elongated handle attached to a non-rotating tine assembly, said tine assembly comprising a plurality of tines sets mounted on a head, each said tine set comprising a plurality of tines, all of said tines extending in a distal direction away from said handle;
    an ejector assembly comprising a sliding sleeve grip member coaxially positioned on said handle, a plurality of ejector blades, each of said ejector blades being positioned between a pair of adjacent tine sets, and a spring mounted on said handle, said spring maintaining said ejector blades in a recessed proximal position;
    whereby movement of said sliding sleeve grip member along said handle in the distal direction extends said ejector blades in the distal direction, thereby causing any objects collected within said tines to be ejected from said device, and further whereby said spring returns said ejector blades proximally to said recessed position.

2. The device of claim 1, wherein said tine sets are laterally mounted on said head, and wherein said ejector blades are laterally mounted on said ejector assembly.

3. The device of claim 1, wherein the number of said tine sets in said tine assembly may be altered by disassembling and reassembling said tine assembly and the number of said ejector blades in said ejection assembly may be altered by disassembling and reassembling said ejector assembly.

4. The device of claim 3, wherein said tine sets comprise differing numbers of tines.

5. The device of claim 3, said tine assembly further comprising spacer members positioned between adjacent tine sets.

6. The device of claim 3, said tine assembly further comprising connector beams, wherein each of said tine sets further comprises a base member having slots to receive said tine assembly connector beams and wherein said head comprises slots to receive said tine assembly connector beams, said tine assembly connector beams being removably positioned within said base member slots and said head slots.

7. The device of claim 6, said ejector assembly further comprising ejector connector beams and strut members having slots to receive said ejector connector beams, said strut members connecting said ejector blades to said sliding sleeve grip member, wherein each of said ejector blades comprises legs having slots to receive said ejector connector beams, said ejector connecting beams removably positioned within said ejector blade slots and said strut member slots.

8. The device of claim 3, said ejector assembly further comprising ejector connector beams and strut members having slots to receive said ejector connector beams, said strut members connecting said ejector blades to said sliding sleeve grip member, wherein each of said ejector blades comprises legs having slots to receive said ejector connector beams, said ejector connecting beams removably positioned within said ejector blade slots and said strut member slots.

9. The device of claim 1, said ejector assembly further comprising extension arms and an extension collar mounted on said handle, wherein said extension arms connect said sliding sleeve grip member to said extension collar and wherein said ejector blades are connected to said extension collar.

10. The device of claim 1, wherein said tines present a curved distal external configuration.

11. A handheld collector device comprising:
    an elongated handle attached to a tine assembly, said tine assembly comprising a plurality of tines sets removably mounted on a head in a lateral configuration, each said tine set comprising a plurality of elongated tines extending in the distal direction from a base member;
    an ejector assembly comprising a sliding sleeve grip member coaxially mounted on said handle, a plurality of removable ejector blades disposed in a lateral configuration and connected to said sliding sleeve grip member by a pair of strut members, each of said ejector blades being positioned between a pair of adjacent tine sets, and a spring mounted on said handle, said spring maintaining said ejector blades in a recessed proximal position;
    said ejector assembly further comprising removable extension arms and a removable extension collar coaxially mounted on said handle, wherein said extension arms connect said sliding sleeve grip member to said extension collar and to said strut members;
    whereby movement of said sliding sleeve grip member along said handle in the distal direction extends said ejector blades in the distal direction, thereby causing any objects collected within said tines to be ejected from said device, and further whereby said spring returns said ejector blades proximally to said recessed position.

12. The device of claim 11, wherein said tine assembly further comprises connector beams, wherein each of said base members comprises slots to receive said tine assembly connector beams, and wherein said head comprises slots to receive said tine assembly connector beams, said tine assembly connector beams being removably disposed within said base member slots and said head slots.

13. The device of claim 12, wherein said ejector assembly further comprises ejector connector beams, wherein said strut members comprise slots to receive said ejector connector beams, and wherein each of said ejector blades comprises legs having slots to receive said ejector connector beams, said ejector connecting beams being removably positioned within said ejector blade slots and said strut member slots.

14. The device of claim 11, wherein said ejector assembly further comprises ejector connector beams, wherein said strut members comprise slots to receive said ejector connector beams, and wherein each of said ejector blades comprises legs having slots to receive said ejector connector beams, said ejector connecting beams being removably positioned within said ejector blade slots and said strut member slots.

15. The device of claim 11, wherein said tine sets comprise differing numbers of tines.

16. The device of claim 11, said tine assembly further comprising spacer members positioned between adjacent tine sets.

* * * * *